J. S. AND M. O. KEPLER.
NUTCRACKER.
APPLICATION FILED NOV. 27, 1916.
1,315,557.
Patented Sept. 9, 1919.
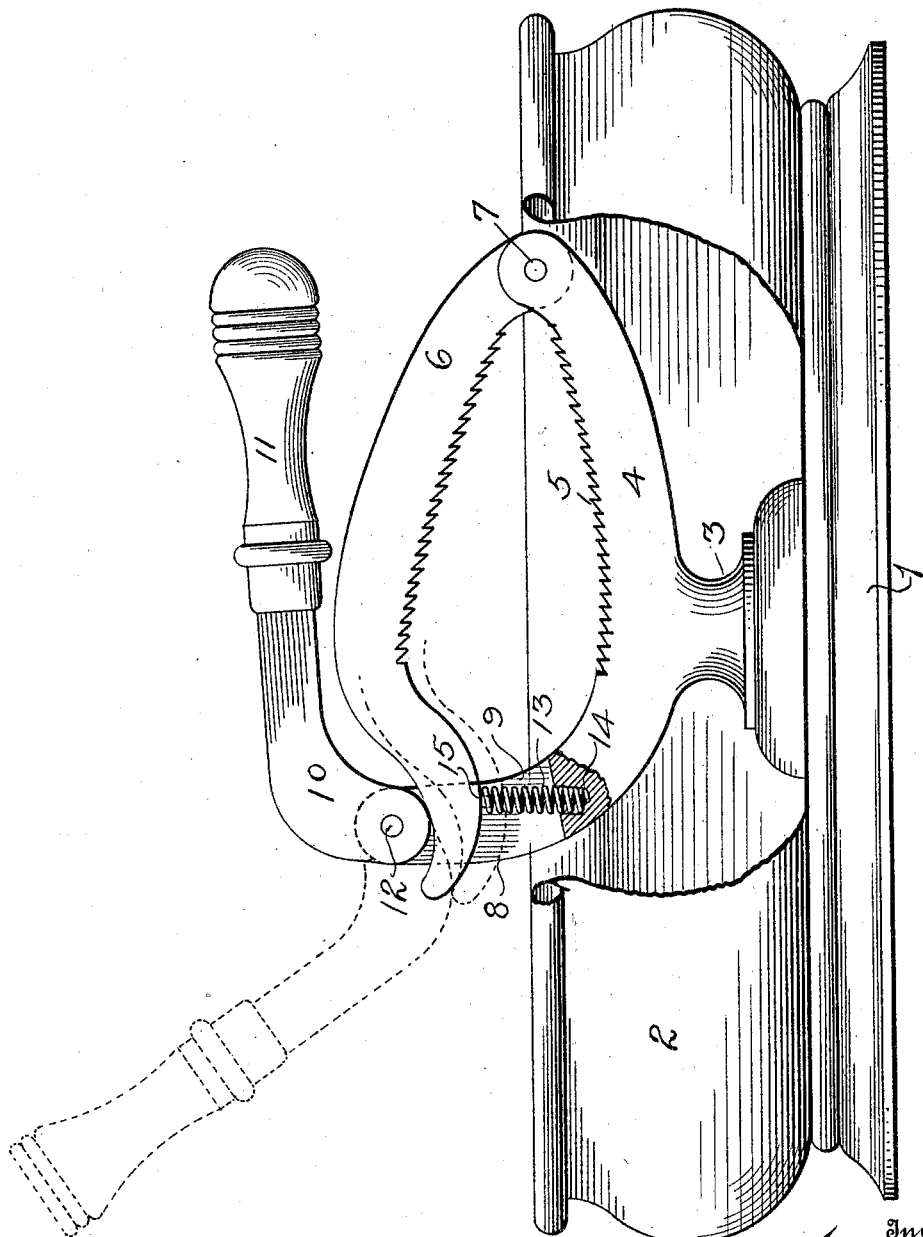

UNITED STATES PATENT OFFICE.

JESSE S. KEPLER, OF DAYTON, OHIO, AND MILTON O. KEPLER, OF NEW YORK, N. Y.

NUTCRACKER.

1,315,557.        Specification of Letters Patent.      Patented Sept. 9, 1919.

Application filed November 27, 1916. Serial No. 133,715.

*To all whom it may concern:*

Be it known that we, JESSE S. KEPLER and MILTON O. KEPLER, citizens of the United States, residing at Dayton, in the county of Montgomery and State of Ohio, and at New York, county of New York, State of New York, respectively, have invented certain new and useful Improvements in Nutcrackers, of which the following is a specification.

Our invention relates to nut crackers, and more particularly to nut cracking apparatus of the lever type.

The object of the invention is to simplify the structure as well as the means and mode of operation of such devices whereby they will not only be cheapened in construction, but will be more efficient in use, positive in operation, easily operated and unlikely to get out of repair.

A further object of the invention is to confine the flying particles of nut shell by means of a bowl or container, within which the cracking apparatus is located, the bowl being so shaped, and the cracking apparatus being relatively proportioned in relation to the bowl, and the jaws of the cracking apparatus being so positioned within the bowl as to confine the flying particles of broken nut shell thereto.

With the above primary and other incidental objects in view as will more fully appear in the specification, the invention consists of the features of construction, the parts and combinations thereof, and the mode of operation or their equivalents as hereinafter described and set forth in the claims.

The accompanying drawing is a side elevation of the assembled nut cracking apparatus, forming the subject matter hereof, with a portion of the bowl broken away to disclose the cracking apparatus, and the cracking apparatus being shown partly in section.

Referring to the drawing, 1 is a base preferably of wood which may be circular, polygonal or rectangular in form. While the base as stated is preferably of wood, it is obvious that the base may be pressed or spun from sheet metal. Mounted upon the base 1 is a bowl or container 2 which may be of any suitable outline or contour, and which is preferably, though not necessarily spun from sheet metal. While the bowl may be of any desired size and proportion, it is preferably made sufficiently large to accommodate a generous supply of cracked and uncracked nuts. Likewise it is of sufficient diameter that the particles of shell which may be projected from a nut by the cracking operation will not be thrown beyond the walls of the bowl. The top of the bowl is somewhat contracted, and the upper portions of the bowl walls are inclined inward whereby particles of shell striking the wall will be deflected downward.

Located centrally within the bowl or container 2, is a pedestal 3 supporting a substantially horizontally disposed cracking jaw 4, serrated as at 5 on its upper edge. Pivoted to one end of the jaw 4 at 7 is a contacting jaw or lever 6. The lower or fixed jaw is extended laterally and upwardly to form an arm 8, bifurcated at its extremity as at 9. The curved free end of the movable jaw 6 projects within the bifurcation 9.

Pivoted intermediate the fingers of the bifurcated arm 8 and above the curved extremity of the movable jaw 6, is a substantially L shaped cam lever 10, provided with a suitable handle 11. This cam lever 10 is pivoted at 12 within the bifurcated extremity of the arm 8, and upon its oscillation about its pivotal connection 12, the cam lever engages the curved free end of the movable jaw 6, and depresses said jaw against a tension of a retracting spring 13. The retracting spring 13 is seated at its lower end in a depression or recess 14, in the lower portion of the bifurcation of the arm 8 and at its upper end it engages a stud or pin 15, projecting from the under side of the movable jaw 6. The L shaped cam lever 10 and the curved extremity of a movable jaw 6 are so shaped that the engagement of the cam lever with the end of the jaw 6 will transmit to the jaw an easy, gradual movement downward, toward the fixed jaw 4, and against the tension of the spring 13, which can be readily controlled by the operator to prevent the undue crushing of the nut meat or kernel after the shell has been collapsed.

The pedestal 3 is of such height that the fixed or stationary jaw 4 located well below the top or periphery of the bowl, whereby the walls of the bowl will afford an effectual barrier to the flying particles of broken shell. The jaws 4 and 6 being pivoted one to the other and normally held in divergent position by the retracting spring 13, will accommodate nuts of different sizes which may be positioned between the jaws at different distances from the pivotal connection 7 according to the relative sizes of the nuts. By arranging the jaws in a horizontal position the weight of the upper or movable jaw 6 which is slightly raised from the spring 13 by the inserted nut, and the weight or normal influence of the cam lever 10 will tend to automatically hold the nut in cracking position without the attention of the operator.

From the above description it will be apparent that there is thus provided a device of the character described, possessing the particular features of advantage before enumerated as desirable but which obviously is susceptible of modification in its form proportion, detail construction or arrangement of parts, without departing from the principle involved or sacrificing any of its advantages.

While in order to comply with the statute, the invention has been described in language more or less specific as to certain structural features, it is to be understood that the invention is not limited to any specific details, but that the means and construction herein described comprise but one mode of putting the invention into effect, and the invention is therefore claimed broadly in any of its possible forms or modifications within the scope of the appended claims.

Having thus described our invention, we claim,

1. As an article of manufacture, a nut cracker comprising a horizontally disposed serrated jaw member, a substantially vertical bifurcated extension at one end of the said jaw member, a second jaw member pivoted to the end of the first mentioned jaw opposite the vertical bifurcated extension having a curved free end extending through and beyond the bifurcation of the said jaw extension, and a substantially L-shaped operating lever pivoted at the extremity of its lateral arm within the bifurcated jaw extension, the elbow of which is adapted to engage the curved end of the second jaw member extending beyond the bifurcated extension and actuate the pivoted jaw upon an upward and outward movement of the operating lever in a direction away from the pivotal connection of the jaws.

2. As an article of manufacture, a pair of pivotally connected jaw members, one of which is upturned at its free end, the free end of the other member being extended beyond said upturned end and an L-shaped elbow lever pivoted at the extremity of said upward portion of the jaw member, the elbow of which is adapted to engage the free end of the opposite jaw member beyond said upturned portion, substantially as specified.

In testimony whereof, we have hereunto set our hands this 7th day of November A. D. 1916.

JESSE S. KEPLER.
MILTON O. KEPLER.

Witnesses to the signature of Jesse S. Kepler:
EDW. E. DUNCAN,
F. L. WALKER.

Witnesses to the signature of Milton O. Kepler:
CHAS. WHITEHEAD,
EDWARD D. PALMER.

Copies of this patent may be obtained for five cents each, by addressing the "Commissioner of Patents, Washington, D. C."